United States Patent
Suzuki

(10) Patent No.: US 12,286,133 B2
(45) Date of Patent: Apr. 29, 2025

(54) VEHICLE CONTROLLER AND VEHICLE CONTROL METHOD

(71) Applicant: KABUSHIKI KAISHA TOYOTA JIDOSHOKKI, Kariya (JP)

(72) Inventor: Genta Suzuki, Kariya (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 183 days.

(21) Appl. No.: 18/161,406

(22) Filed: Jan. 30, 2023

(65) Prior Publication Data
US 2023/0242148 A1 Aug. 3, 2023

(30) Foreign Application Priority Data
Feb. 2, 2022 (JP) .................................. 2022-015002

(51) Int. Cl.
*B60W 40/072* (2012.01)
*B60W 60/00* (2020.01)
(52) U.S. Cl.
CPC ........ *B60W 60/001* (2020.02); *B60W 40/072* (2013.01); *B60W 2554/80* (2020.02)
(58) Field of Classification Search
CPC ............. B60W 60/001; B60W 40/072; B60W 2554/80
See application file for complete search history.

(56) References Cited

FOREIGN PATENT DOCUMENTS

| JP | 2001222320 A | * | 8/2001 | |
|---|---|---|---|---|
| JP | 2019156222 A | * | 9/2019 | ......... B62D 15/0265 |
| JP | 6975255 B2 | * | 12/2021 | ............ B60W 30/09 |

* cited by examiner

Primary Examiner — Aryan E Weisenfeld
Assistant Examiner — Jeffrey R Chalhoub
(74) Attorney, Agent, or Firm — Sughrue Mion, PLLC

(57) ABSTRACT

A vehicle controller is configured to execute a recognition process of recognizing a state of an object in a recognizable area set on a front side of a host vehicle, and a driving control process of performing a vehicle control of causing the host vehicle to travel based on a recognition result of the recognition process. The recognizable area includes a regular recognition area and a quasi-recognition area when a band-shaped scheduled traveling area along a travel route on which the host vehicle travels is curved. The driving control process includes performing the vehicle control according to a first driving mode when the recognition result of the recognition process indicates that an obstacle exists in the regular recognition area, and performing the vehicle control according to a second driving mode when the recognition result of the recognition process indicates that an obstacle exists in the quasi-recognition area.

5 Claims, 4 Drawing Sheets

VEHICLE CONTROLLER AND VEHICLE CONTROL METHOD

BACKGROUND

1. Field

The present disclosure relates to a vehicle controller and a vehicle control method.

2. Description of Related Art

Recently, research and practical application have advanced in the field of vehicle autonomous driving. A typical example uses a technique in which a recognition area is set in advance in front of a vehicle at the time of execution of autonomous driving, and speed control is performed according to the distance from the vehicle to an obstacle detected within the recognition area.

In the typical example, the recognition area includes a region other than a travel route depending on the direction of the vehicle. As a result, there are cases in which an obstacle that does not affect traveling of the vehicle is detected and speed control is performed. In particular, in the typical example, there are cases in which an obstacle that does not affect the traveling of the vehicle is detected in the inner region of the curved travel route and the speed control is performed.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a vehicle controller includes processing circuitry that is configured to execute a recognition process of recognizing a state of an object in a recognizable area set on a front side of a host vehicle, and a driving control process of performing a vehicle control of causing the host vehicle to travel based on a recognition result of the recognition process. The recognizable area includes a regular recognition area and a quasi-recognition area when a band-shaped scheduled traveling area along a travel route on which the host vehicle travels is curved. There are multiple boundary positions between the regular recognition area and the quasi-recognition area. The driving control process includes performing the vehicle control according to a first driving mode of maintaining a distance to an obstacle at a specified distance when the recognition result of the recognition process indicates that the obstacle exists in the regular recognition area, and performing the vehicle control according to a second driving mode of maintaining a distance to one of the boundary positions that is farthest from the host vehicle at the specified distance when the recognition result of the recognition process indicates that an obstacle exists in the quasi-recognition area.

In another general aspect, a vehicle control method includes recognizing a state of an object in a recognizable area set on a front side of a host vehicle, the recognizable area having a sectoral shaped spread having a specified central angle from a representative point of the host vehicle, and performing a vehicle control of causing the host vehicle to travel based on a recognition result in which a state of an object in the recognizable area is recognized. The recognizable area includes at least two regular recognition areas and a quasi-recognition area when a band-shaped scheduled traveling area along a travel route on which the host vehicle travels is curved. Each regular recognition area is a part of the recognizable area that overlaps the scheduled traveling area. The quasi-recognition area is a part of the recognizable area that does not overlap the scheduled traveling area, and is between the two regular recognition areas in a specified direction, the specified direction being a direction from the representative point toward the front side at a specified angle within a range of the central angle. Two boundary positions between the two regular recognition areas and the quasi-recognition area exist on a straight line in the specified direction. Performing the vehicle control includes performing the vehicle control according to a first driving mode of maintaining a distance to an obstacle at a specified distance when the recognition result indicates that the obstacle exists in the regular recognition area, and performing the vehicle control according to a second driving mode of maintaining a distance to one of the boundary positions that is farthest from the host vehicle at the specified distance when the recognition result indicates that an obstacle exists in the quasi-recognition area.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

Embodiment

Hereinafter, an embodiment of a vehicle controller will be described with reference to the drawings. The vehicle controller of the embodiment is used in, for example, a vehicle that executes autonomous driving. The autonomous driving means, for example, executing driving control by controlling at least one of steering, acceleration, or deceleration of the vehicle. The driving control described above includes, for example, an adaptive cruise control system (ACC), a traffic jam pilot (TJP), automatic lane changing (ALC), a collision mitigation brake system (CMBS), a lane keeping assistance system (LKAS), and the like. In addition, in a vehicle that executes autonomous driving, driving control by manual driving of an occupant may be executed.

[Overall Configuration]

Figure 1:
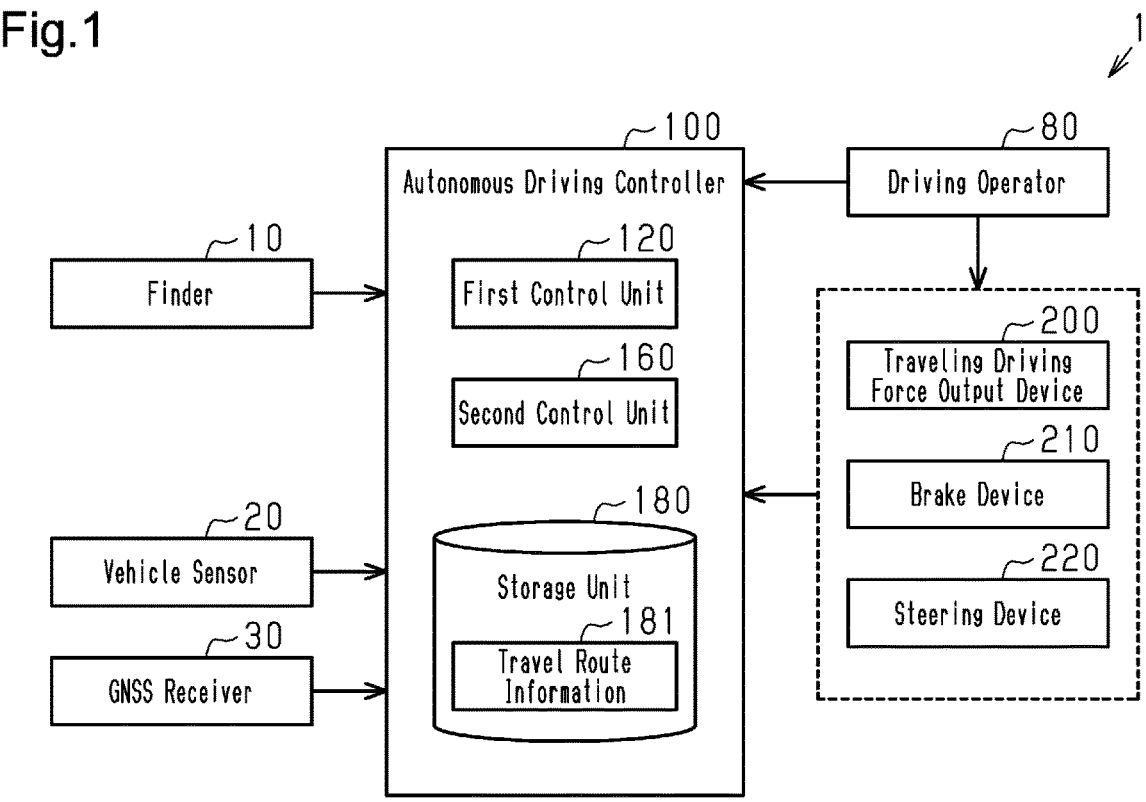
FIG. 1 is a diagram illustrating an example of a configuration of a vehicle system.

FIG. 1 is a configuration diagram of a vehicle system 1 in accordance with an embodiment. The vehicle on which the vehicle system 1 is mounted is, for example, a two-wheel, three-wheel, or four-wheel vehicle, and a driving source thereof is an internal combustion engine such as a diesel engine or a gasoline engine, an electric motor, or a combination thereof. The electric motor operates using power generated by a power generator coupled to an internal combustion engine or discharge power of a rechargeable battery or a fuel cell. Hereinafter, a vehicle on which the vehicle system 1 is mounted will be referred to as a host vehicle M.

The vehicle system 1 includes, for example, a finder 10, a vehicle sensor 20, a global navigation satellite system (GNSS) receiver 30, a driving operator 80, an autonomous driving controller 100, a traveling driving force output device 200, a brake device 210, and a steering device 220. These devices and equipment are connected to each other by a multiplex communication line such as a controller area network (CAN) communication line, a serial communication line, a wireless communication network, or the like. The configuration illustrated in FIG. 1 is merely an example, and a part of the configuration may be omitted, or another configuration may be added. An autonomous driving controller 100 is an example of a vehicle controller.

The finder 10 is, for example, a light detection and ranging (LIDAR) type. The finder 10 irradiates the periphery of the host vehicle M with light and measures the scattered light. The finder 10 detects the distance to a target based on a time from light emission to light reception. The emitted light is, for example, pulsed laser light. The finder 10 outputs the detection result to the autonomous driving controller 100. In the present embodiment, the finder 10 is attached to the end on the front side of the host vehicle M. The finder 10 emits light in a sectoral shape having a specified central angle φ in plan view toward the front side of the host vehicle M to detect the distance to the target. As a result, as will be described later, a sectoral-shaped recognizable area having a specified central angle φ is set on the front side of the host vehicle M.

The vehicle sensor 20 includes a vehicle speed sensor that detects the speed of the host vehicle M, an acceleration sensor that detects acceleration, a yaw rate sensor that detects angular velocity around a vertical axis, an orientation sensor that detects the direction of the host vehicle M, and the like.

The GNSS receiver 30 identifies the position of the host vehicle M based on a signal received from a GNSS satellite. The position of the host vehicle M may be identified or complemented by an inertial navigation system (INS) using the output of the vehicle sensor 20.

The driving operator 80 includes, for example, an accelerator pedal, a brake pedal, a shift lever, a steering wheel, a joystick, and other operators. The steering wheel may be circular or non-circular. A sensor that detects an operation amount or presence or absence of an operation by an occupant or the like is attached to the driving operator 80, and a detection result thereof is output to at least one of the autonomous driving controller 100, the traveling driving force output device 200, the brake device 210, and the steering device 220.

The autonomous driving controller 100 which is processing circuitry includes, for example, a first control unit 120, a second control unit 160, and a storage unit 180. The first control unit 120 and the second control unit 160 are implemented, for example, by a hardware processor such as a central processing unit (CPU) executing a program (software). Furthermore, some or all of these constituent elements may be implemented by a hardware circuit such as large scale integration (LSI), an application specific integrated circuit (ASIC), a field-programmable gate array (FPGA), or a graphics processing unit (GPU), or may be implemented by cooperation of software and hardware. The program may be stored in advance in a storage device (a storage device including a non-transitory storage medium) such as a hard disk drive (HDD) or a flash memory of the autonomous driving controller 100. In addition, when the program is stored in a removable storage medium such as a DVD or a CD-ROM, the storage medium (non-transitory storage medium) may be installed in the HDD or the flash memory of the autonomous driving controller 100 by being mounted on the drive device of the host vehicle M.

The storage unit 180 may include the various storage devices described above. Furthermore, the storage unit 180 may include, for example, an HDD, a flash memory, an electrically erasable programmable read only memory (EEPROM), a read-only memory (ROM), a RAM (RAM), or the like. The storage unit 180 stores, for example, a program and travel route information 181. The travel route information 181 is information indicating coordinates of a travel route RT1 on which the host vehicle M travels.

Figure 2:
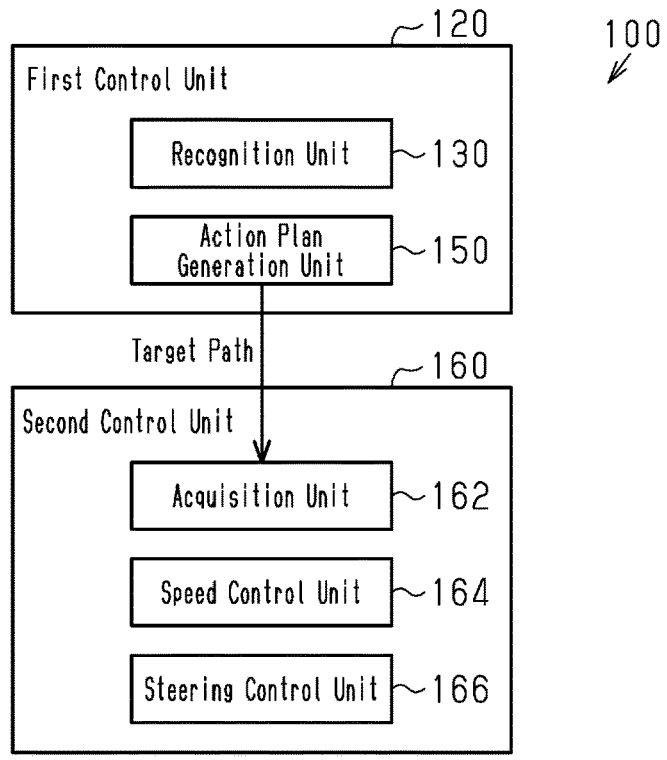
FIG. 2 is a functional configuration diagram of a first control unit and a second control unit of the vehicle system of FIG. 1.

As illustrated in FIG. 2, the first control unit 120 includes, for example, a recognition unit 130 and an action plan generation unit 150. A combination of the action plan generation unit 150 and the second control unit 160 is an example of the driving control unit.

The recognition unit 130 recognizes the surrounding situation of the host vehicle M. For example, the recognition unit 130 recognizes the state of an object such as the position, speed, acceleration, and advancing direction of the object in the recognizable area set on the front side of the host vehicle M based on the information input from the finder 10. The object around the host vehicle M is, for example, a surrounding vehicle or a target. The position of the object is recognized as, for example, a position at relative coordinates with a representative point of the host vehicle M as an origin, and is used for control. Hereinafter, a case in which the representative point of the host vehicle M is the center of the drive axle of the host vehicle M and the drive axle of the host vehicle M is the drive axle of the rear wheels will be described. The position of the object may be represented by a representative point such as a center of gravity, a center, or a corner of the object, or may be represented by a region in which the object is expressed. When the object is a vehicle, the state of the object may include acceleration or jerk of the object. In addition, the state of the object may include an action state such as whether a lane change is being made or a lane change is about to be made.

In principle, the action plan generation unit 150 refers to the travel route information 181 and generates a target path so as to travel on a specified travel route. In addition, the action plan generation unit 150 autonomously generates a target path on which the host vehicle M will travel in the future (without depending on the operation of the driver) so as to cope with the surrounding situation of the host vehicle M. The target path includes, for example, a speed element. For example, the target path is expressed as a sequence of points at which the host vehicle M should travel on. Hereinafter, a point at which the host vehicle M should travel on will be referred to as a path point. The path point is a point to be traveled on by the host vehicle M for each specified travel distance on the travel route. Apart from the path points, a target speed and a target acceleration for every specified sampling time are generated as part of the target path. The specified travel distance is, for example, several meters. The specified sampling time is, for example, about several tenths of a second. In addition, the path point may be a position expressed on the basis of time, and may be a position that the host vehicle M should travel on every specified sampling time. In this case, the information of the target speed and the target acceleration is expressed by the interval of the path points.

The action plan generation unit 150 determines whether an obstacle exists in the regular recognition area based on the recognition result of the recognition unit 130. The regular recognition area is an area overlapping a scheduled traveling area of the host vehicle M in the recognizable area. The scheduled traveling area is, for example, an area along the travel route between the current position of the host vehicle M and a position distant from the current position by a specified distance among all the travel routes indicated by the travel route information 181. The scheduled traveling area has a specified width in a direction orthogonal to the advancing direction of the host vehicle M. That is, the scheduled traveling area is a band-shaped area. Details of the process in which the action plan generation unit 150 determines whether an obstacle exists in the regular recognition area will be described later.

When determining that no obstacle exists in the regular recognition area, the action plan generation unit 150 performs a speed control according to the distance of the travel route so that the speed of the host vehicle M becomes constant. When determining that an obstacle exists in the regular recognition area, the action plan generation unit 150 performs a vehicle control according to a driving mode in which the distance to the obstacle is maintained at a specified distance. Specifically, the action plan generation unit 150 generates a target path that maintains the distance to the obstacle at a specified distance, and causes the host vehicle M to travel. In the following description, the driving mode in which the distance to the obstacle is maintained at a specified distance will be referred to as a first driving mode. Therefore, when determining that an obstacle exists in the regular recognition area, the action plan generation unit 150 performs a vehicle control according to the first driving mode.

In addition, the action plan generation unit 150 determines whether an obstacle exists in a quasi-recognition area based on the recognition result of the recognition unit 130. The quasi-recognition area is an area that does not overlap the scheduled traveling area of the host vehicle M in the recognizable area. The quasi-recognition area is generated when the scheduled traveling area has a relatively large curve. A direction from the representative point of the host vehicle M toward the front side at a specified angle within the range of the central angle φ of the sectoral shape formed by the recognizable area is defined as a specified direction. The quasi-recognition area is arranged between two regular recognition areas in a specified direction. Details of the process in which the action plan generation unit 150 determines whether an obstacle exists in the quasi-recognition area will be described later.

When the action plan generation unit 150 determines that an obstacle exists in the quasi-recognition area, two boundary positions between the regular recognition area and the quasi-recognition area exist on a straight line along a specified direction. The action plan generation unit 150 performs a vehicle control according to a driving mode in which the distance to one of the two boundary positions that is farthest from the host vehicle M is maintained at a specified distance. Specifically, the action plan generation unit 150 generates a target path that maintains the distance to one of the two boundary positions that is farthest from the current position of the host vehicle M at a specified distance, and causes the host vehicle M to travel. In the following description, a driving mode in which the distance from the host vehicle M to the boundary position that is farthest from the host vehicle M is maintained at a specified distance will be referred to as a second driving mode. Therefore, when determining that an obstacle exists in the quasi-recognition area, the action plan generation unit 150 performs a vehicle control according to the second driving mode.

The second control unit 160 controls the traveling driving force output device 200, the brake device 210, and the steering device 220 such that the host vehicle M passes through the target path generated by the action plan generation unit 150 on schedule.

The second control unit 160 includes, for example, an acquisition unit 162, a speed control unit 164, and a steering control unit 166. The acquisition unit 162 acquires information of the target path (i.e., the path point) generated by the action plan generation unit 150 and stores the information in a memory (not illustrated). The speed control unit 164 controls the traveling driving force output device 200 or the brake device 210 based on the speed element associated with the target path stored in the memory. The steering control unit 166 controls the steering device 220 according to the bending of the target path stored in the memory. The processes of the speed control unit 164 and the steering control unit 166 are implemented by, for example, a combination of feedforward control and feedback control. As an example, the steering control unit 166 executes the feedforward control corresponding to the curvature of the road in front of the host vehicle M and the feedback control based on a deviation from the target path in combination.

The traveling driving force output device 200 outputs traveling driving force (torque) for the vehicle to travel to the driving wheels. The traveling driving force output device 200 includes, for example, a combination of an internal combustion engine, an electric motor, a transmission, and the like, and an electronic control unit (ECU) that controls the same. The ECU controls the above configuration in accordance with information input from the second control unit 160 or information input from the driving operator 80.

The brake device 210 includes, for example, a brake caliper, a cylinder that transmits hydraulic pressure to the brake caliper, an electric motor that generates hydraulic pressure in the cylinder, and a brake ECU. The brake ECU controls the electric motor in accordance with the information input from the second control unit 160 or the information input from the driving operator 80 so that the brake torque corresponding to the input information is output to each wheel. The brake device 210 may include, as a backup, a mechanism that transmits the hydraulic pressure generated by the operation of the brake pedal, which is the driving operator 80, to the cylinder via the master cylinder. The brake device 210 is not limited to the configuration described above, and may be an electronically controlled hydraulic brake device that controls an actuator according to information input from the second control unit 160 and transmits the hydraulic pressure of the master cylinder to the cylinder.

The steering device 220 includes, for example, a steering ECU and an electric motor. For example, the electric motor changes the direction of the steerable wheels by applying a force on the rack and pinion mechanism. The steering ECU drives the electric motor according to the information input from the second control unit 160 or the information input from the driving operator 80 to change the direction of the steerable wheels.

[Quasi-Recognition Area]

Figure 3:
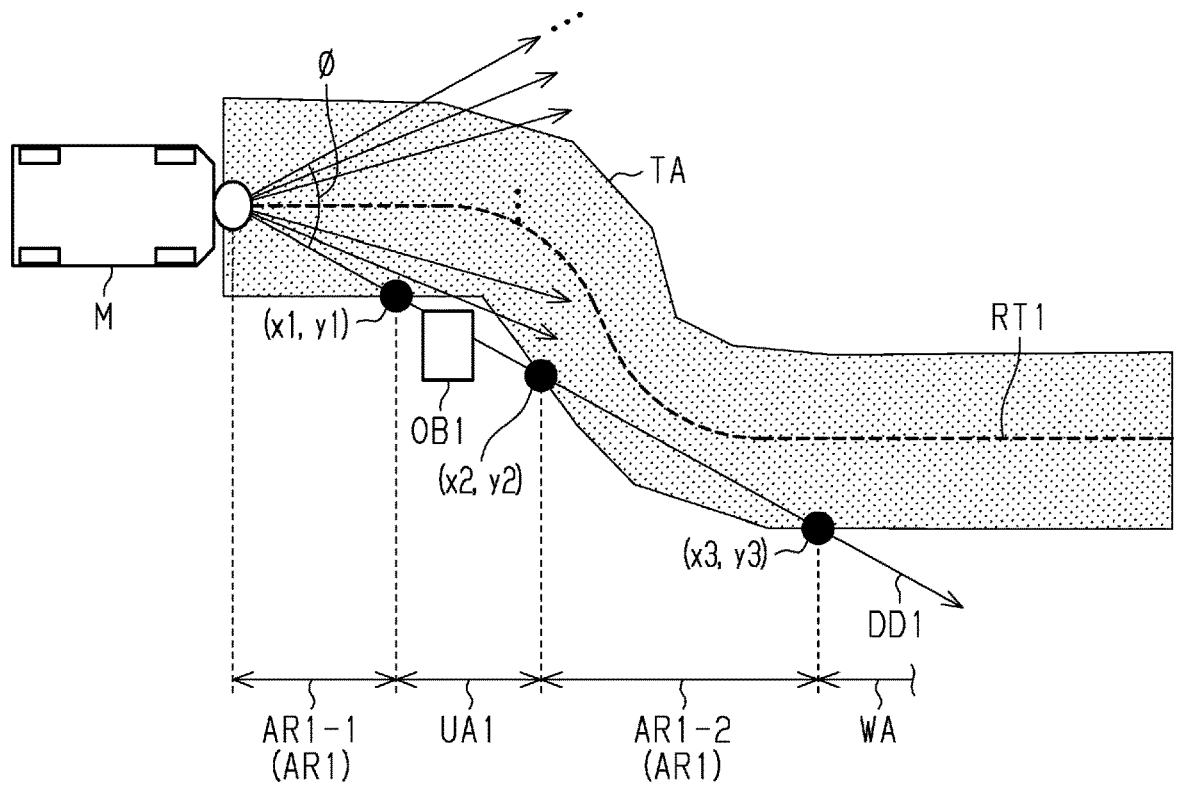
FIG. 3 is an explanatory diagram of a quasi-recognition area recognized by a recognition unit of the first control unit in FIG. 2.

Details of the quasi-recognition area will be described below. As illustrated in FIG. 3, the finder 10 irradiates a range spreading in a sectoral shape having a central angle $\varphi$ in the advancing direction of the host vehicle M with light to detect the distance to the target. As described above, the travel route information 181 indicates the coordinates of the travel route RT1. The scheduled traveling area TA is a band-shaped area having a specified width along the travel route RT1. This allows the recognition unit 130 to identify the coordinates of the end in the width direction of the scheduled traveling area TA in the recognizable area, that is, the end of the regular recognition area AR1, with the representative point of the host vehicle M as the origin. As a result, the recognition unit 130 identifies the quasi-recognition area UA1 on a straight line along the specified direction DD1, which is a direction heading toward the front side at a specified angle within the range of the central angle $\varphi$ from the representative point of the host vehicle M. In the example illustrated in FIG. 3, the straight line along the specified direction DD1 intersects with the end in the width direction of the scheduled traveling area TA at three locations, that is, coordinates (x1, y1), coordinates (x2, y2), and coordinates (x3, y3). Therefore, it is determined that in the specified direction DD1, the regular recognition area AR1 exists in the range from the origin to the coordinates (x1, y1) and the range from the coordinates (x2, y2) to the coordinates (x3, y3), and the quasi-recognition area UA1 exists in the range from the coordinates (x1, y1) to the coordinates (x2, y2). The coordinates (x1, y1) and the coordinates (x2, y2) are boundary positions between the regular recognition area AR1 and the quasi-recognition area UA1.

In the following description, in the specified direction DD1, the regular recognition area AR1 existing at a position closer to the host vehicle M than the quasi-recognition area UA1 will be referred to as a first regular recognition area AR1-1, and the regular recognition area AR1 existing at a position farthest from the host vehicle M than the quasi-recognition area UA1 will be referred to as a second regular recognition area AR1-2. Furthermore, an area which is a range outside the recognition area AR1 and is not the quasi-recognition area UA1 will be referred to as a non-recognition area WA. Therefore, when the specified direction DD1 is viewed from the representative point of the host vehicle M, the first regular recognition area AR1-1, the quasi-recognition area UA1, the second regular recognition area AR1-2, and the non-recognition area WA exist in that order.

In the example illustrated in FIG. 3, the action plan generation unit 150 determines that an obstacle OB1 exists in the quasi-recognition area UA1 based on the recognition result of the recognition unit 130. Therefore, the action plan generation unit 150 performs the vehicle control according to the second driving mode. In the example illustrated in FIG. 3, of the coordinates (x1, y1) and the coordinates (x2, y2), the coordinates (x2, y2) are boundary positions farthest from the host vehicle M. Therefore, the action plan generation unit 150 performs vehicle control so as to maintain the distance from the origin to the coordinates (x2, y2) at a specified distance.

Figure 4:
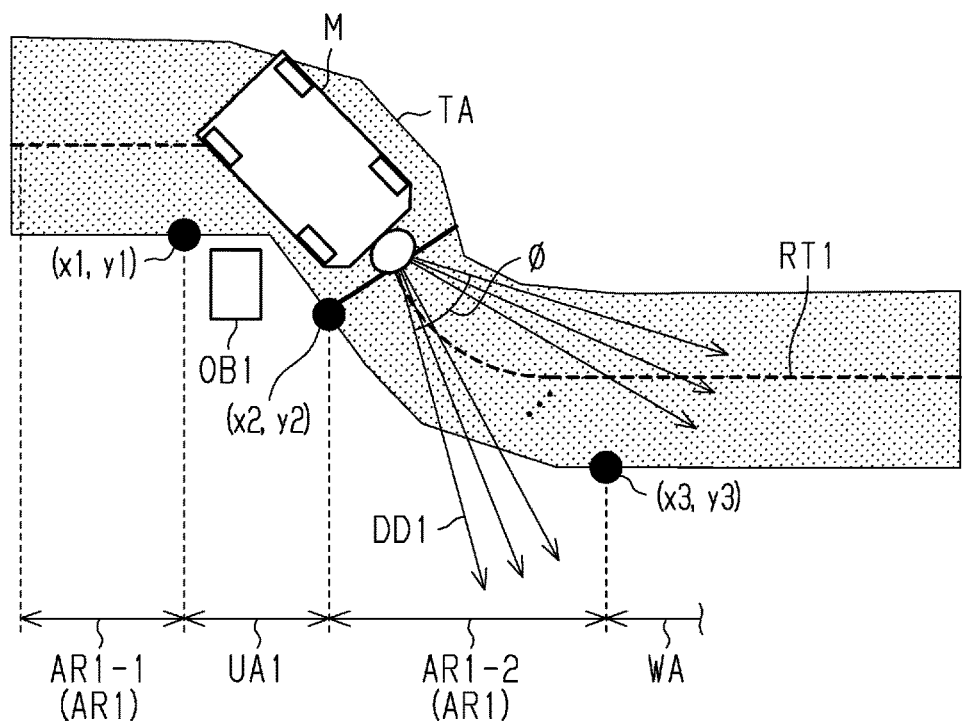
FIG. 4 is an explanatory diagram of the quasi-recognition area recognized by the recognition unit of the first control unit in FIG. 2.

As illustrated in FIG. 4, when the host vehicle M travels to the vicinity of the coordinates (x2, y2) by the control of the action plan generation unit 150, the obstacle OB1 is not included in the recognizable area, which is the detection range of the finder 10. Therefore, the action plan generation unit 150 thereafter performs the vehicle control according to the first driving mode or the speed control according to the distance of the travel route RT1 so that the speed becomes constant without being affected by the presence of the obstacle OB1.

[Determination Process of Obstacle]

Figure 5:
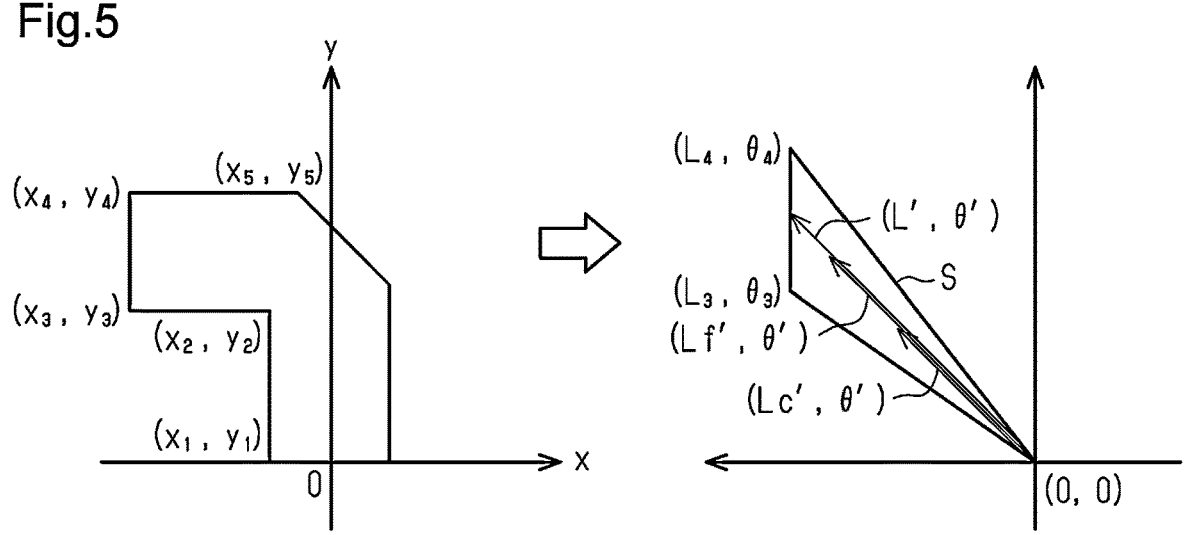
FIG. 5 is an explanatory diagram of an obstacle determination process by an action plan generation unit of the second control unit in FIG. 2.

Hereinafter, details of the process in which the action plan generation unit 150 determines whether the obstacle OB1 exists in the regular recognition area AR1 will be described. The action plan generation unit 150 converts the range of Cartesian coordinates indicating the regular recognition area AR1 into polar coordinates having the representative point of the host vehicle M as the origin. As illustrated in FIG. 5, the action plan generation unit 150 converts the range of Cartesian coordinates indicating the regular recognition area AR1 into polar coordinates. By converting the Cartesian coordinates into polar coordinates, the action plan generation unit 150 converts the range of the regular recognition area AR1 in the recognizable area into a triangular range S having the coordinates ($L_3$, $\theta_3$), the coordinates ($L_4$, $\theta_4$), and the origin of the polar coordinates as vertices. The range S is expressed by the following expression (1). A range from the angle $\theta_3$ to the angle $\theta_4$ is a range of the regular recognition area AR1 in the recognizable area. The distance $L_3$ is a distance to the end of the regular recognition area AR1 in the angle $\theta_3$ direction. The distance $L_4$ is a distance to the end of the regular recognition area AR1 in the angle $\theta_4$ direction.

$$S = \tfrac{1}{2} L_3 L_4 \sin(\theta_4 - \theta_3) = \tfrac{1}{2}(L_3 L' \sin(\theta' - \theta_3) + L_4 L' \sin(\theta_4 - \theta')) \quad (1)$$

where

S is the range of regular recognition area in the polar coordinate system;

$\theta_3$ is the angle within the range of central angle $\varphi$;

$\theta_4$ is the angle within the range of central angle $\varphi$ ($\theta_4 > \theta_3$);

$L_3$ is the distance to the end of the regular recognition area AR1 in the angle $\theta_3$ direction; and $L_4$ is the distance to the end of the regular recognition area AR1 in the angle $\theta_4$ direction.

The finder 10 detects an object existing in the recognizable area at a specified resolution. The specified resolution is, for example, about several tenths of a degree to several degrees. The action plan generation unit 150 identifies the distance L' to the end of the regular recognition area AR1 in the angle θ' direction within the range from the angle $\theta_3$ to the angle $\theta_4$ using the following expression (2) based on expression (1).

$$L'=L_3L_4\sin(\theta_4-\theta_3)/(L_3\sin(\theta'-\theta_3)+L_4\sin(\theta_4-\theta')) \quad (2)$$

where

θ' is the angle within the range from angle $\theta_3$ to angle $\theta_4$; and

L' is the distance to the end of the regular recognition area AR1 in the angle θ' direction.

The action plan generation unit 150 identifies the range of the quasi-recognition area UA1 at the angle θ' for each angle θ' at the time of conversion into polar coordinates based on the range of Cartesian coordinates indicating the regular recognition area AR1. As illustrated in FIG. 5, the action plan generation unit 150 identifies a distance Lc' to coordinates (x1, y1) which is a boundary position close to the host vehicle M, of the two boundary positions, at an angle θ' of the finder 10. In addition, the action plan generation unit 150 identifies a distance Lf' to coordinates (x2, y2) which is a boundary position farthest from the host vehicle M, of the two boundary positions, at the angle θ' of the finder 10.

When the distance to the object in the angle θ' direction is longer than the distance L' to the end of the identified regular recognition area AR1 in the detection result of the finder 10, the action plan generation unit 150 determines that the obstacle OB1 does not exist in the regular recognition area AR1 (i.e., exists in the non-recognition area WA). Furthermore, when the distance to the object in the angle θ' direction is less than or equal to the distance L' and greater than or equal to the distance Lf in the detection result of the finder 10, the action plan generation unit 150 determines that the obstacle OB1 exists in the regular recognition area AR1. In addition, when the distance to the object in the angle θ' direction is less than the distance Lf and longer than the distance Lc' in the detection result of the finder 10, the action plan generation unit 150 determines that the obstacle OB1 exists in the quasi-recognition area UA1. Furthermore, when the distance to the object in the angle θ' direction is less than or equal to the distance Lc' in the detection result of the finder 10, the action plan generation unit 150 determines that the obstacle OB1 exists in the regular recognition area AR1.

[Operation Flow]

Figure 6:
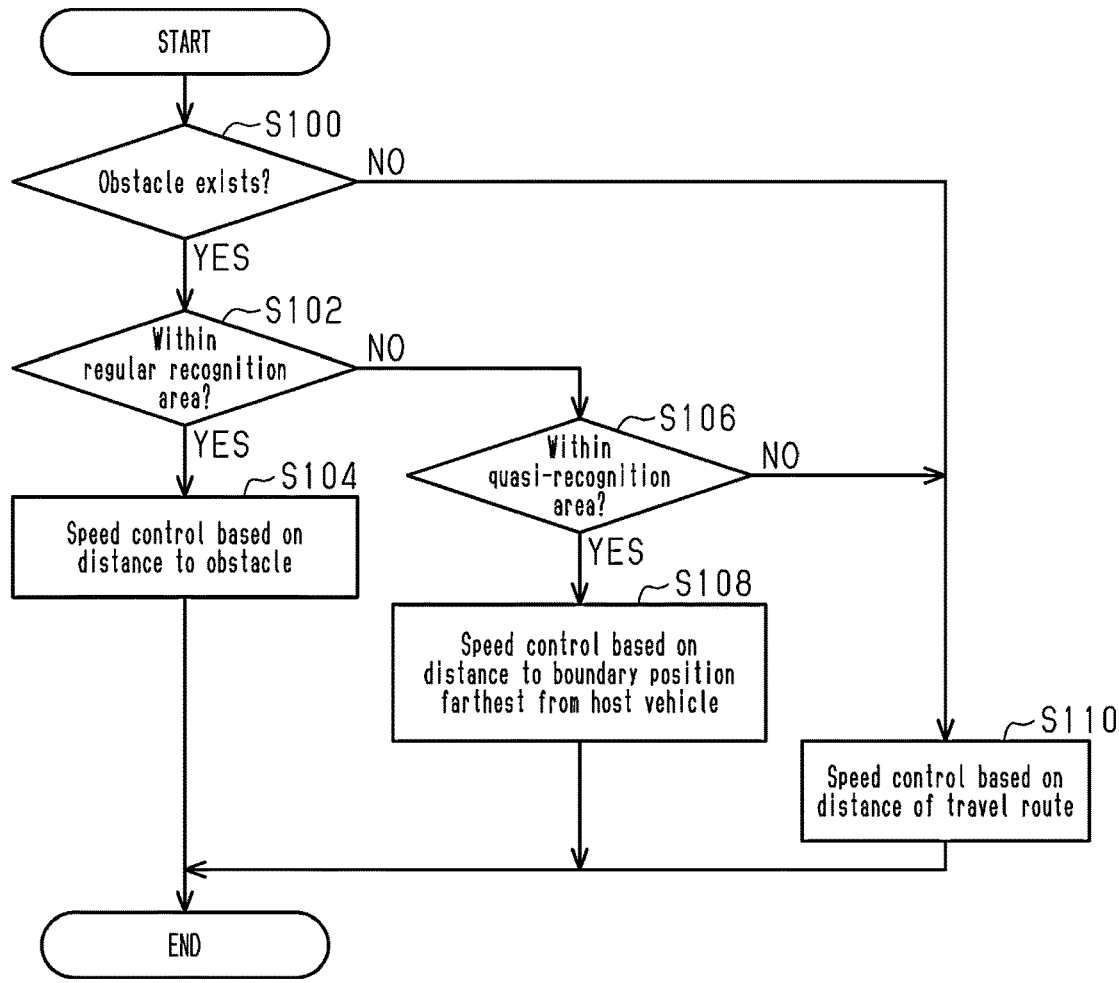
FIG. 6 is a flowchart illustrating an example of a process executed by an autonomous driving controller of the vehicle system in FIG. 1.

Hereinafter, processes executed by the autonomous driving controller 100 will be described with reference to FIG. 6. The processes of the present flowchart are executed, for example, at specified time intervals. First, the action plan generation unit 150 determines whether the obstacle OB1 exists around the host vehicle M based on the recognition result of the recognition unit 130 (step S100). When determining that the obstacle OB1 exists, the action plan generation unit 150 determines whether the obstacle OB1 exists in the regular recognition area AR1 (step S102). When determining that the obstacle OB1 exists in the regular recognition area AR1, the action plan generation unit 150 performs a speed control according to the first driving mode (step S104).

When determining that the obstacle OB1 does not exist in the regular recognition area AR1, the action plan generation unit 150 determines whether the obstacle OB1 exists in the quasi-recognition area UA1 (step S106). When determining that the obstacle OB1 exists in the quasi-recognition area UA1, the action plan generation unit 150 performs a speed control according to the second driving mode (step S108). When determining that the obstacle OB1 does not exist around the host vehicle M and when determining that the obstacle OB1 does not exist in the quasi-recognition area UA1, the action plan generation unit 150 determines that the obstacle OB1 exists in the non-recognition area WA, and performs speed control according to the distance of the travel route RT1 so that the speed becomes constant (step S110).

Operational Advantages of Embodiment

The embodiment described above has the following operational advantages.

(1) The autonomous driving controller 100, which is a vehicle controller, includes the recognition unit 130, the action plan generation unit 150, and the second control unit 160. The recognition unit 130 recognizes a state of an object in a recognizable area set on the front side of the host vehicle M. The action plan generation unit 150 and the second control unit 160 perform vehicle control of the host vehicle M on the basis of the recognition result of the recognition unit 130. Specifically, when the recognition result of the recognition unit 130 indicates that the obstacle OB1 exists in the regular recognition area AR1, the action plan generation unit 150 and the second control unit 160 perform the vehicle control according to the first driving mode. Also, when the recognition result of the recognition unit 130 indicates that the obstacle OB1 exists in the quasi-recognition area UA1, the action plan generation unit 150 and the second control unit 160 perform the vehicle control according to the second driving mode.

When the host vehicle M travels on the travel route RT1 including a curve, the finder 10 may detect the obstacle OB1 existing at a position on the inner side region of the curved travel route RT1 and outside the regular recognition area AR1. The obstacle OB1 does not affect traveling of the host vehicle M along the travel route RT1. However, when the action plan generation unit 150 and the second control unit 160 perform the speed control on the basis of the presence of such an obstacle OB1, there are cases in which the vehicle unnecessarily decelerates.

According to such a configuration, the action plan generation unit 150 varies the driving mode based on at which position the obstacle OB1 recognized by the recognition unit 130 exists among the regular recognition area AR1, the quasi-recognition area UA1, and the non-recognition area WA. Therefore, the second control unit 160 prevents speed control from being unnecessarily performed based on the obstacle OB1 existing in the quasi-recognition area UA1 and the obstacle OB1 in the non-recognition area WA.

(2) The action plan generation unit 150 and the second control unit 160 convert the regular recognition area AR1 into polar coordinates based on the coordinates of vertices of the regular recognition area AR1 in Cartesian coordinates. The action plan generation unit 150 and the second control unit 160 determine whether the obstacle OB1 exists in the quasi-recognition area UA1 based on the quasi-recognition area UA1 between the regular recognition areas AR1 converted into polar coordinates and the recognition result of the recognition unit 130.

The recognition unit 130 may output the detection result of the finder 10 to the action plan generation unit 150 as a recognition result. The detection result of the finder 10 may be expressed by a polar coordinate system indicating an angle within the range of the central angle φ of the sectoral shape formed by the recognizable area and a distance to the detected object. According to such a configuration, the action plan generation unit 150 converts the regular recognition area AR1 and the quasi-recognition area UA1 into polar coordinates in advance without sequentially converting the detection result of the finder 10 from the Cartesian coordinate system to the polar coordinate system. As a result, the action plan generation unit 150 reduces the processing load of determining at which position the obstacle OB1 exists among the regular recognition area AR1, the quasi-recognition area UA1, or the non-recognition area WA.

The embodiment described above may be modified as below. The above embodiment and each of the following examples may be combined with each other within a scope not technically contradicting each other.

Figure 7:
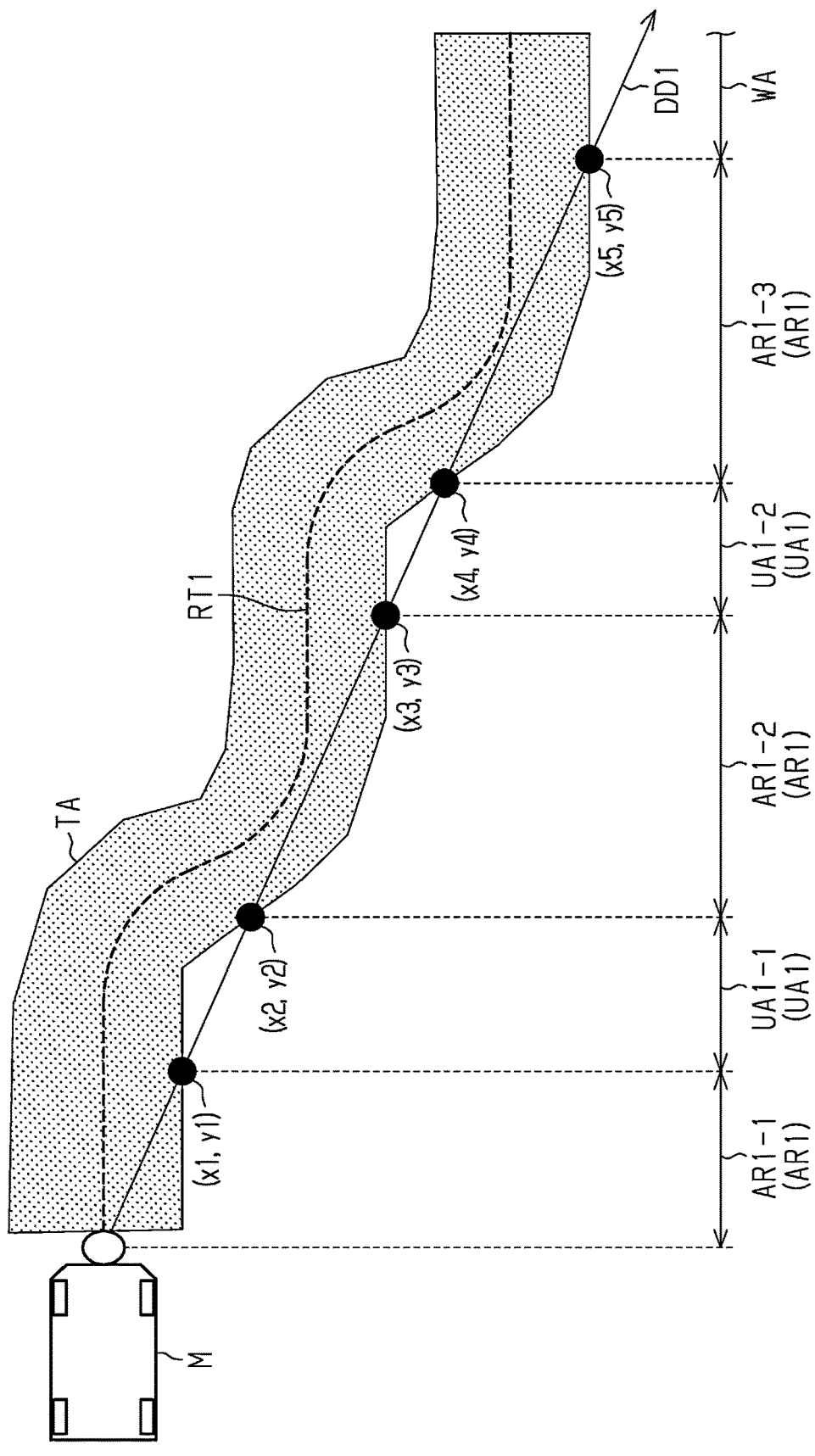
FIG. 7 is an explanatory diagram of multiple quasi-recognition areas recognized by the recognition unit of the first control unit in FIG. 2.

In the above description, the case in which one quasi-recognition area UA1 exists between the first regular recognition area AR1-1 and the second regular recognition area AR1-2 in the specified direction DD1 has been described, but the present disclosure is not limited thereto. When the travel route RT1 has a complicated shape, a plurality of quasi-recognition areas UA1 may exist in the specified direction DD1. As illustrated in FIG. 7, the recognition unit 130 can identify the presence of a first regular recognition area AR1-1 in a range from the representative point of the host vehicle M to the coordinates (x1, y1), a first quasi-recognition area UA1-1 in a range from the coordinates (x1, y1) to the coordinates (x2, y2), a second regular recognition area AR1-2 in a range from the coordinates (x2, y2) to the coordinates (x3, y3), a second quasi-recognition area UA1-2 in a range from the coordinates (x3, y3) to the coordinates (x4, y4), a third regular recognition area AR1-3 in a range from the coordinates (x4, y4) to the coordinates (x5, y5), and a non-recognition area WA in a range farther than the coordinates (x5, y5) in the specified direction DD1.

When multiple quasi-recognition areas UA1 exist, the action plan generation unit 150 performs the vehicle control of the host vehicle M using, as the regular recognition area AR1, the quasi-recognition area UA1 other than the quasi-recognition area UA1 closest to the host vehicle M, among the plurality of quasi-recognition areas UA1. In the example of FIG. 7, the quasi-recognition areas UA1 includes the first quasi-recognition area UA1-1 and the second quasi-recognition area UA1-2. In this case, the action plan generation unit 150 performs the vehicle control of the host vehicle M using the second quasi-recognition area UA1-2 other than the first quasi-recognition area UA1-1 closest to the host vehicle M, of the first quasi-recognition area UA1-1 and the second quasi-recognition area UA1-2, as the regular recognition area AR1.

When the action plan generation unit 150 makes a determination for each of the quasi-recognition areas UA1, data of polar coordinates for each specified direction DD1 used for the determination of the quasi-recognition area UA1 is identified. In this case, the processing load related to the specification of the quasi-recognition area UA1 increases as the number of the quasi-recognition areas UA1 increases in the action plan generation unit 150. According to such a configuration, the action plan generation unit 150 reduces the processing load related to the specification of the quasi-recognition area UA1 by performing vehicle control on the basis of the quasi-recognition area UA1 closest to the host vehicle M, among the quasi-recognition areas UA1.

Among the quasi-recognition areas UA1, the quasi-recognition area UA1 other than the quasi-recognition area UA1 closest to the host vehicle M may not immediately affect the vehicle control even when the obstacle OB1 exists in the that quasi-recognition area UA1. On the other hand, there are cases in which the obstacle OB1 existing in the quasi-recognition area UA1 other than the closest quasi-recognition area UA1 moves to the regular recognition area AR1 before the host vehicle M approaches the vicinity. According to such a configuration, the action plan generation unit 150 treats the quasi-recognition area UA1 other than the closest quasi-recognition area UA1 as the regular recognition area AR1. Therefore, when the obstacle OB1 currently exists in the quasi-recognition area UA1 and moves to the regular recognition area AR1 later, the vehicle control is immediately performed according to the suited driving mode that corresponds to the existence of the obstacle OB1.

The vehicle system 1 may include a camera instead of (or in addition to) the finder 10 as a configuration for detecting a distance to an object existing around the host vehicle M. The camera may be, for example, a digital camera using a solid-state imaging element such as a charge coupled device (CCD) or a complementary metal oxide semiconductor (CMOS). The camera is attached to any suitable part of the host vehicle M. For example, when capturing an image of the front side of the host vehicle M, the camera is attached to an upper portion of a front windshield, a rear surface of a rearview mirror, or the like. In addition, when capturing an image of the rear side of the host vehicle M, the camera is attached to the upper portion of the rear windshield or the like. In addition, when capturing an image of the right side or the left side of the host vehicle M, the camera is attached to the right side surface, the left side surface, or the like of the vehicle body or the door mirror. The camera may be provided for each imaging direction. In this case, the front camera, the rear camera, or the like that captures an image of the front side or the rear side, may have higher sensitivity than the side camera that captures an image of the right side or the left side. The camera, for example, periodically and repeatedly captures an image of the periphery of the host vehicle M. The camera may be a stereo camera.

The vehicle system 1 may include a radar device instead of (or in addition to) the finder 10 as a configuration for detecting a distance to an object existing around the host vehicle M. The radar device emits radio waves such as a millimeter waves to the periphery of the host vehicle M, and detects radio waves (reflected waves) reflected by an object to detect at least the distance of the object and the orientation of the object. The radar device is attached to any suitable part of the host vehicle M. The radar device may detect the position and speed of the object by a frequency modulated continuous wave (FM-CW) method.

In addition to detecting an object in the horizontal direction of X-Y in which one direction in the horizontal direction is X and the other direction is Y, the finder 10 may also detect an object in a vertical direction-Z, which is orthogonal to the horizontal direction of X-Y.

In the above description, the case in which the finder 10 is attached to the end on the front side of the host vehicle M has been described, but the present disclosure is not limited thereto. The finder 10 may be attached to any suitable part of the host vehicle M as long as an object existing in front of the host vehicle M can be detected. In this case, the recognition unit 130 corrects the detection result of the finder 10 according to the position at which the finder 10 is attached. Specifically, the recognition unit 130 corrects the detection result of the finder 10 so as to cancel out the amount of deviation from the center of the distal end of the host vehicle M and the amount of deviation from the center of the host vehicle M in the width direction.

The host vehicle M may travel on the route determined by the navigation device instead of (or in addition to) the travel route RT1 indicated in the travel route information 181. The navigation device includes a navigation human machine interface (HMI), a route determination unit, and first map information. For example, the route determination unit determines an on-map route from the position of the host vehicle M identified by the GNSS receiver 30 (or an input position) to a destination input by an occupant using a navigation human machine interface (HMI) with reference to the first map information. The first map information is, for example, information in which a road shape is expressed by a link indicating a road and a node connected by the link. The first map information may include curvature of a road, point of interest (POI) information, and the like. The on-map route is output to a map positioning unit (MPU). The navigation device may perform route guidance using the navigation HMI based on the on-map route. The navigation device may be implemented by, for example, a terminal device such as a smartphone or a tablet terminal held by the occupant. The navigation device may transmit the current position and the destination to the navigation server via a communication device that communicates with a device outside the host vehicle M, and acquire a route equivalent to the on-map route from the navigation server.

The MPU includes, for example, a recommended lane determination unit, and holds the second map information in a storage device such as an HDD or a flash memory. The recommended lane determination unit divides the on-map route provided from the navigation device into a plurality of blocks (e.g., divided every 100 m in the vehicle advancing direction), and determines the recommended lane for each block with reference to the second map information. The recommended lane determination unit determines, for example, which lane to travel in starting from the left. When a branching point exists on the on-map route, the recommended lane determination unit determines the recommended lane so that the host vehicle M can travel on a reasonable route for traveling to the branching destination.

The second map information is map information with higher accuracy than the first map information. The second map information includes, for example, information on the center of the lane, information on the boundary of the lane, and the like. In addition, the second map information may include road information, traffic regulation information, address information (address/zip code), facility information, telephone number information, and the like. The second map information may be updated as needed by the communication device communicating with another device. The action plan generation unit 150 executes the various processes described above with the recommended lane determined by the MPU as the travel route RT1. According to such a configuration, the action plan generation unit 150 and the second control unit 160 can also adapt the processes described above to the travel route RT1 other than the travel route RT1 specified by the travel route information 181.

The position of the host vehicle M may be identified by a ranger system or simultaneous localization and mapping (SLAM) instead of (or in addition to) the GNSS receiver 30.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A vehicle controller, comprising:
   processing circuitry configured to execute
      a recognition process of recognizing a state of an object in a recognizable area set on a front side of a host vehicle, and
      a driving control process of performing a vehicle control of causing the host vehicle to travel based on a recognition result of the recognition process, wherein
   the recognizable area includes a recognition area and a quasi-recognition area when a band-shaped scheduled traveling area along a travel route on which the host vehicle travels is curved,
   there are multiple boundary positions between the recognition area and the quasi-recognition area, and
   the driving control process includes
      performing the vehicle control according to a first driving mode of maintaining a distance to an obstacle at a specified distance when the recognition result of the recognition process indicates that the obstacle exists in the recognition area, and
      performing the vehicle control according to a second driving mode of maintaining a distance to one of the boundary positions that is farthest from the host vehicle at the specified distance when the recognition result of the recognition process indicates that an obstacle exists in the quasi-recognition area.

2. The vehicle controller according to claim 1, wherein
   the recognizable area has a sectoral shaped spread having a specified central angle from a representative point of the host vehicle,
   the recognition area includes at least two recognition areas,
   each recognition area is a part of the recognizable area that overlaps the scheduled traveling area,
   the quasi-recognition area is a part of the recognizable area that does not overlap the scheduled traveling area and is arranged between the two recognition areas in a specified direction, the specified direction being a direction from the representative point toward the front side at a specified angle within a range of the central angle,
   two boundary positions between the two recognition areas and the quasi-recognition area exist on a straight line in the specified direction,
   the second driving mode is a driving mode that maintains a distance to one of the boundary positions that is farthest from the host vehicle at the specified distance.

3. The vehicle controller according to claim 1, wherein the driving control process includes, when the quasi-recognition area includes multiple quasi-recognition areas in the specified direction, setting the quasi-recognition area other than the quasi-recognition area closest to the host vehicle as the recognition area.

4. The vehicle controller according to claim 1, wherein the recognition area includes at least two recognition areas, and the driving control process includes:

converting each recognition area into polar coordinates based on coordinates of vertices of the recognition area in-into Cartesian coordinates; and determining whether an obstacle exists in the quasi-recognition area based on the quasi-recognition area between the recognition areas converted into polar coordinates and a recognition result of the recognition unit.

5. A vehicle control method, comprising:

recognizing a state of an object in a recognizable area set on a front side of a host vehicle, the recognizable area having a sectoral shaped spread having a specified central angle from a representative point of the host vehicle; and performing a vehicle control of causing the host vehicle to travel based on a recognition result in which a state of an object in the recognizable area is recognized, wherein the recognizable area includes at least two recognition areas and a quasi-recognition area when a band-shaped scheduled traveling area along a travel route on which the host vehicle travels is curved, each recognition area is a part of the recognizable area that overlaps the scheduled traveling area, the quasi-recognition area is a part of the recognizable area that does not overlap the scheduled traveling area, and is between the two recognition areas in a specified direction, the specified direction being a direction from the representative point toward the front side at a specified angle within a range of the central angle, two boundary positions between the two recognition areas and the quasi-recognition area exist on a straight line in the specified direction; and performing the vehicle control includes performing the vehicle control according to a first driving mode of maintaining a distance to an obstacle at a specified distance when the recognition result indicates that the obstacle exists in the recognition area, and performing the vehicle control according to a second driving mode of maintaining a distance to one of the boundary positions that is farthest from the host vehicle at the specified distance when the recognition result indicates that an obstacle exists in the quasi-recognition area.

* * * * *